(12) United States Patent
Huang et al.

(10) Patent No.: US 8,722,847 B2
(45) Date of Patent: May 13, 2014

(54) POLYMERS WITH HYDROXYL ACID BLOCKS

(75) Inventors: Bin Huang, Fremont, CA (US); Edwin W. Huang, Fremont, CA (US)

(73) Assignee: Molecon, Inc., Union City, CA (US)

( * ) Notice: Subject to any disclaimer, the term of this patent is extended or adjusted under 35 U.S.C. 154(b) by 351 days.

(21) Appl. No.: 13/061,802

(22) PCT Filed: Sep. 8, 2009

(86) PCT No.: PCT/US2009/056222
§ 371 (c)(1),
(2), (4) Date: May 20, 2011

(87) PCT Pub. No.: WO2010/030599
PCT Pub. Date: Mar. 18, 2010

(65) Prior Publication Data
US 2011/0213100 A1      Sep. 1, 2011

Related U.S. Application Data

(60) Provisional application No. 61/095,541, filed on Sep. 9, 2008.

(51) Int. Cl.
*C08G 63/60*     (2006.01)
*C08G 63/06*     (2006.01)
*C08G 63/66*     (2006.01)

(52) U.S. Cl.
USPC .................. 528/318; 525/437; 525/425

(58) Field of Classification Search
USPC ............... 525/437, 425; 528/318, 323
See application file for complete search history.

(56) References Cited

U.S. PATENT DOCUMENTS

| | | | |
|---|---|---|---|
| 3,284,417 A * | 11/1966 | Hostettler et al. | ............ 528/357 |
| 3,773,737 A | 11/1973 | Goodman et al. | |
| 3,960,152 A | 6/1976 | Augurt et al. | |
| 4,243,775 A | 1/1981 | Rosensaft et al. | |
| 4,441,496 A | 4/1984 | Shalaby et al. | |
| 4,481,353 A | 11/1984 | Nyilas et al. | |
| 4,737,550 A | 4/1988 | Tomalia et al. | |
| 4,857,599 A | 8/1989 | Tomalia et al. | |
| 4,916,193 A | 4/1990 | Tang et al. | |
| 4,916,209 A | 4/1990 | Fung et al. | |
| 4,920,203 A | 4/1990 | Tang et al. | |
| 4,994,551 A | 2/1991 | Fung et al. | |
| 5,030,703 A | 7/1991 | Pielartzik et al. | |
| 5,041,516 A | 8/1991 | Frechet et al. | |
| 5,066,772 A | 11/1991 | Tang et al. | |
| 5,120,802 A | 6/1992 | Mares et al. | |
| 5,145,945 A | 9/1992 | Tang et al. | |
| 5,152,781 A | 10/1992 | Tang et al. | |
| 5,202,413 A * | 4/1993 | Spinu | ............ 528/354 |
| 5,256,762 A | 10/1993 | Hermes et al. | |
| 5,270,400 A * | 12/1993 | Spinu | ............ 525/411 |
| 5,349,047 A | 9/1994 | Hermes et al. | |
| 6,313,235 B1 | 11/2001 | Kuo et al. | |
| 6,489,434 B2 | 12/2002 | Jen | |
| 6,913,806 B2 | 7/2005 | Jen | |
| 7,297,721 B2 | 11/2007 | Kulkarni | |
| 2006/0009611 A1 | 1/2006 | Hayes | |
| 2006/0178477 A1 | 8/2006 | Neuenschwander | |
| 2007/0249654 A1 | 10/2007 | Bourissou et al. | |
| 2011/0190470 A1 | 8/2011 | Huang | |

FOREIGN PATENT DOCUMENTS

| | | | | |
|---|---|---|---|---|
| EP | 0684961 B1 | 11/1998 | | |
| GB | 1528133 A | * 10/1978 | ............ | C08G 63/76 |
| JP | 5262866 A | 10/1993 | | |
| WO | WO94/19384 | * 2/1993 | ............ | C08G 18/42 |
| WO | WO 2007/089779 A2 | 8/2007 | | |
| WO | WO 2007/089779 A3 | 9/2007 | | |

OTHER PUBLICATIONS

Clark, et al. Reactions of potassium fluoride in glacial acetic acid with with chlorocarboxylic acids, amides, and chlorides. The effect of very strong hydrogen bonding on the nucleophilicity of the fluoride anion. J Chem Soc. 1975;2129-2134.

International search report and written opinion dated May 6, 2010 for PCT application No. PCT/US2009/056222.

International search report and written opinion dated Aug. 5, 2009 for PCT application No. PCT/US2009/043805.

Moorlag, et al. (S)-2-Chloropropanoyl chloride. A convenient reagent for the determination of the enantiomeric composition of x-Substituted x-hydroxy acids. Recueil des Travaux chimiques des pays-bas. 1990; 109(9):479-480.

Wang, et al. Oxygen permeability of biodegradable copolycaprolactones. Polymers for advanced technologies. 1999; 10(5):282-286.

* cited by examiner

*Primary Examiner* — Randy Gulakowski
*Assistant Examiner* — Christopher M Rodd
(74) *Attorney, Agent, or Firm* — Fox Rothschild LLP; Jianming Hao

(57) ABSTRACT

The present invention relates polymers comprising non-degradable blocks and degradable blocks and methods of manufacturing such polymers.

5 Claims, No Drawings

POLYMERS WITH HYDROXYL ACID BLOCKS

CROSS REFERENCE TO RELATED APPLICATIONS

This application claims the benefit of, and priority to, U.S. Provisional Patent Application Ser. No. 61/095,541, filed on Sep. 9, 2008, the entire disclosure of which is hereby incorporated by reference in its entirety.

FIELD OF THE INVENTION

The present invention relates to the preparation of modified polymers by chemically incorporating a compositional modifier into a polymer chain to produce the modified polymer. More particularly, the invention relates to the preparation of condensation type copolyesters by joining short length polyester or polyester oligomers with a modifier which contains hydroxyl acids blocks.

BACKGROUND OF THE INVENTION

Condensation polymers such as thermoplastic polyesters, polycarbonates, and polyamides have many desirable physical and chemical attributes that make them useful for a wide variety of molded, fiber, and film applications. However, for specific applications, these polymers also exhibit limitations that should be minimized or eliminated. To overcome these limitations, polymers are frequently made containing one or more additives or comonomers depending upon the desired end use of the polymer. One of the most common thermoplastic polyester polymers is polyethylene terephthalate (PET). PET polymer is used extensively in the packaging industry, especially in the production of bottles for carbonated and non-carbonated beverages. In the carbonated beverage industry, concerns include the rate of carbon dioxide escape from the container, taste deterioration of the contents due to degradation by light, and extraction of additives added either during melt polymerization or subsequent melt processing that is required to fabricate the container. To overcome these problems, PET resins are often modified by incorporating unique comonomers into the polymer backbone thus producing a wide variety of PET copolyesters. For example, 2,6-naphthalenedicarboxylate (2,6-NDC) is copolymerized with ethylene glycol (EG) and terephthalic acid (TPA), propylene glycol is copolymerized with ethylene glycol (EG) and terephthalic acid (TPA) (U.S. Pat. No. 6,313,235), and isophthalic acid (IPA) is copolymerized with ethylene glycol (EG) and terephthalic acid (TPA) (U.S. Pat. Nos. 7,297,721, 6,489,434, and 6,913,806).

Condensation polymers may be degraded by hydrolysis with catalyst of acid, or base. The rate of depolymerization depends upon the structure of the polymers. Poly(hydroxyl acids), such as poly glycolic acid or poly lactic acid or copolymers of glycolic acid and lactic acid are easily hydrolyzed at mild conditions, even at pH 7 and room temperature in several months. Therefore, poly(hydroxyl acids) have wide applications based on their degradability, such as in medical devices and drug delivery system. On the other hand, polyethylene terephthalate (PET) hydrolyzes very slowly at mild conditions. To decompose such kind of polyester will require high temperature and high pressure through reaction with methanol, ethylene glycol or ammonia/glycol, which all involves organic solvents. PET and its derivatives have also wide applications based on their non-degradability and mechanical strength, such as fibers, packaging bottles and films.

Although there are many attempts to modify condensation polymers for extension of their application as described above, no attempts have been reported to incorporate degradable blocks of polyester into non-degradable condensation polyester in which the degradable blocks are uniformly distributed in the polymer chains.

SUMMARY OF THE INVENTION

In one aspect, the present invention provides a polymer comprising non-degradable blocks and degradable blocks. In some embodiments, the polymer has a structure of Formulae (Ia) or (Ib):

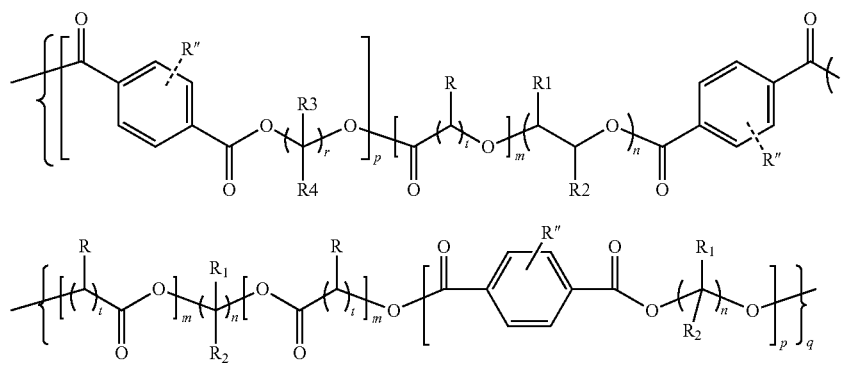

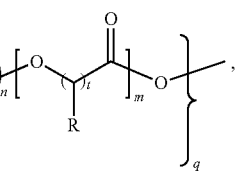

wherein t, m, p, q, r are integers other than zero, n is integers includes zero, R, $R_1$, $R_2$, $R_3$, $R_4$, R" are members independently selected in each structural units from H, substituted or unsubstituted alkyl, substituted or unsubstituted heteroalkyl, substituted or unsubstituted cycloalkyl, substituted or unsubstituted heterocycloalkyl, substituted or unsubstituted aryl and substituted or unsubstituted heteroaryl, substituted or unsubstituted alkoxy, ester, nitro, amine, amide, or thiol. In some embodiments, the R, $R_1$, $R_2$, $R_3$, $R_4$, R" are independently $C_1$-$C_{10}$ alkyls.

In some embodiments, the degradable blocks has a structure according to Formula (III)

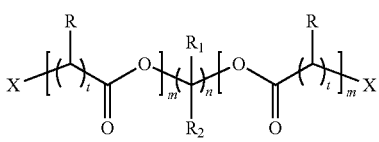

wherein t, m, n are integers other than zero, X is Cl, Br, I, NH$_2$—, HO—, R'OCO—C$_6$H$_4$—COO— (where R' is H, CH$_3$, C$_2$H$_5$ or any other alkyls) or other polymer chains and R, R$_1$, R$_2$ are members independently selected in each structural units from H, substituted or unsubstituted alkyl, substituted or unsubstituted heteroalkyl, substituted or unsubstituted cycloalkyl, substituted or unsubstituted heterocycloalkyl, substituted or unsubstituted aryl and substituted or unsubstituted heteroaryl, substituted or unsubstituted alkoxy, ester, nitro, amine, amide, or thiol.

In some embodiments, the degradable blocks has a structure according to Formula (IV):

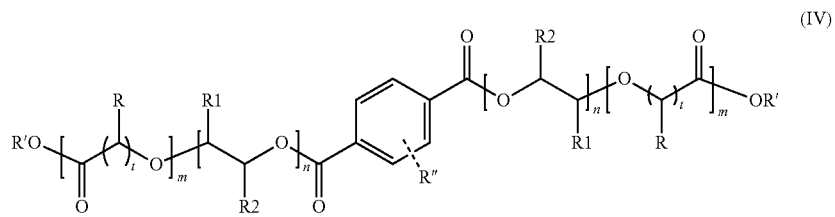

(IV)

wherein t, m, n are integers, R, R$_1$, R$_2$, are alkyls (CH$_3$, C$_2$H$_5$ ...), R" is any substitute groups, and R' is H or alkyls.

In another aspect, the present invention provides a degradable segment according to Formula (III):

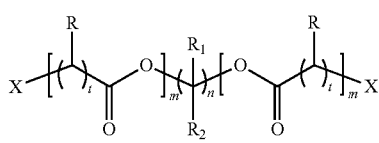

(III)

wherein t, m, n are integers other than zero, X is Cl, Br, I, NH$_2$—, HO—, R'OCO—C$_6$H$_4$—COO— (where R' is H, CH$_3$, C$_2$H$_5$ or any other alkyls) or other polymer chains and R, R$_1$, R$_2$ are members independently selected in each structural units from H, substituted or unsubstituted alkyl, substituted or unsubstituted heteroalkyl, substituted or unsubstituted cycloalkyl, substituted or unsubstituted heterocycloalkyl, substituted or unsubstituted aryl and substituted or unsubstituted heteroaryl, substituted or unsubstituted alkoxy, ester, nitro, amine, amide, or thiol. In some embodiments the degradable segment is made according to Scheme Ia:

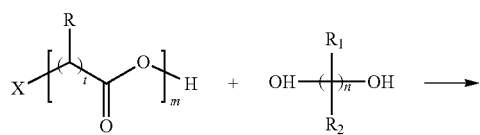

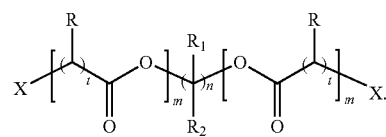

-continued

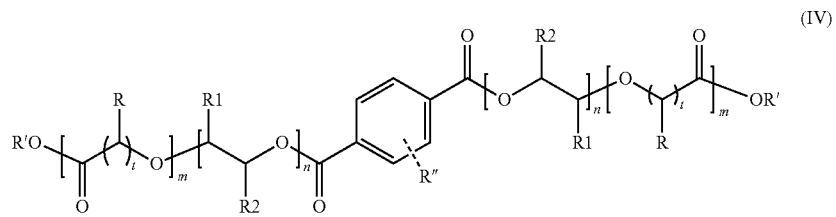

In another aspect, the present invention provides a degradable segment according to Formula (IV):

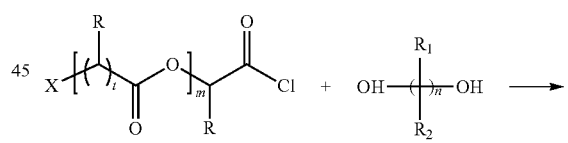

(IV)

wherein t, m, n are integers, R, R$_1$, R$_2$ are alkyls (CH$_3$, C$_2$H$_5$ ...), R" is any substitute groups, and R' is H or alkyls. In some embodiments the degradable segment is made according to Scheme Ib:

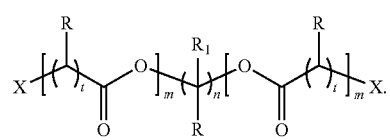

In another aspect, the present invention provides a method of making a polymer comprising degradable blocks and non-degradable blocks, said method comprises the steps of: (a) synthesizing degradable hydroxyl acids blocks; (b) polymerizing non degradable polymer monomer or pre polymer with degradable hydroxyl acids blocks to form said polymers in a solution polymerization process or melting polymerization process.

In another aspect, the present invention provides a method of making a polymer comprising degradable blocks and non-degradable blocks, said method comprises the steps of (a) synthesizing degradable hydroxyl acids blocks; (b) synthesizing non-degradable polymers; and (c) joining said non-degradable blocks with and said degradable polymers in a solution polymerization process or melting polymerization process.

In some embodiments of the method provided herein, the polymer has the structure according to Formulae (Ia) or (Ib):

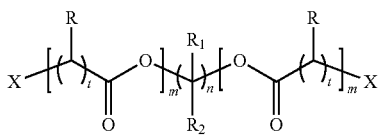

(III)

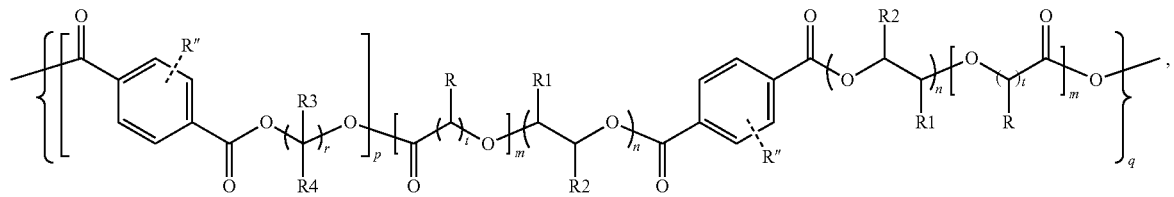

(Ia)

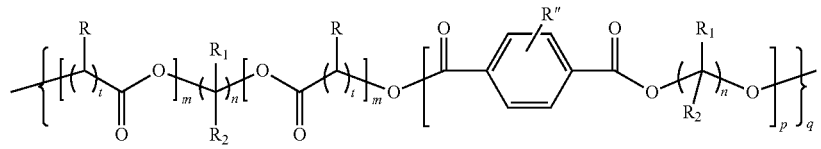

(Ib)

wherein t, m, n, p, q are integers other than zero, R, $R_1$, $R_2$, $R_3$, $R_4$, R" are members independently selected in each structural units from H, substituted or unsubstituted alkyl, substituted or unsubstituted heteroalkyl, substituted or unsubstituted cycloalkyl, substituted or unsubstituted heterocycloalkyl, substituted or unsubstituted aryl and substituted or unsubstituted heteroaryl, substituted or unsubstituted alkoxy, ester, nitro, amine, amide, or thiol.

In some embodiments of the method provided herein the degradable blocks have the structure according to Formula (II):

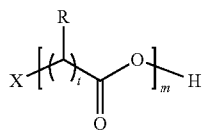

(II)

wherein t, m are integers; X is Cl, Br, I, $NH_2-$, or HO—, $R'OCO-C_6H_4-COO-$ (where R' is H, $CH_3$, $C_2H_5$ or any other alkyls) and R is H, substituted or unsubstituted alkyl, substituted or unsubstituted heteroalkyl, substituted or unsubstituted cycloalkyl, substituted or unsubstituted heterocycloalkyl, substituted or unsubstituted aryl and substituted or unsubstituted heteroaryl, substituted or unsubstituted alkoxy, ester, nitro, amine, amide, or thiol, or Formula (III):

wherein t, m, n are integers other than zero, X is Cl, Br, I, $NH_2-$, HO—, $R'OCO-C_6H_4-COO-$ (where R' is H, $CH_3$, $C_2H_5$ or any other alkyls), and R, $R_1$, $R_2$ are members independently selected in each structural units from H, substituted or unsubstituted alkyl, substituted or unsubstituted heteroalkyl, substituted or unsubstituted cycloalkyl, substituted or unsubstituted heterocycloalkyl, substituted or unsubstituted aryl and substituted or unsubstituted heteroaryl, substituted or unsubstituted alkoxy, ester, nitro, amine, amide, or thiol.

In some embodiments of the method provided herein, the degradable blocks are diol. In some embodiments, the non-degradable blocks are esters. In some embodiments, the degradable blocks have the structure according to Formula (IV):

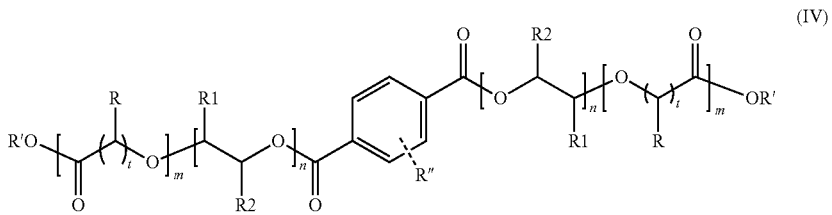

(IV)

wherein t, m, n are integers, X is Cl, Br, I, $NH_2-$, HO—, R is alkyls ($CH_3$, $C_2H_5$ ...), R" is any substitute groups, and R' is H or alkyls.

In some embodiments of the method provided herein, the step (a) is carried out according to Scheme (Ia):

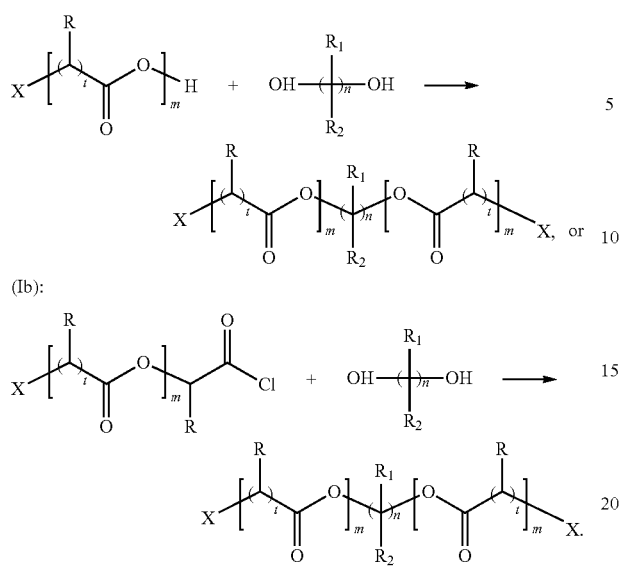

In some embodiments of the method provided herein, step (a) is carried out according to Scheme (II):

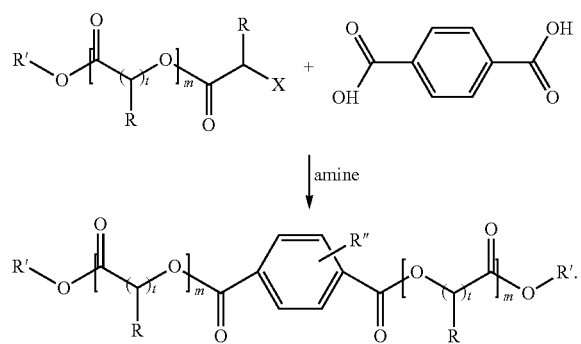

In some embodiments of the method provided herein, step (c) is carried out according to Scheme (IV):

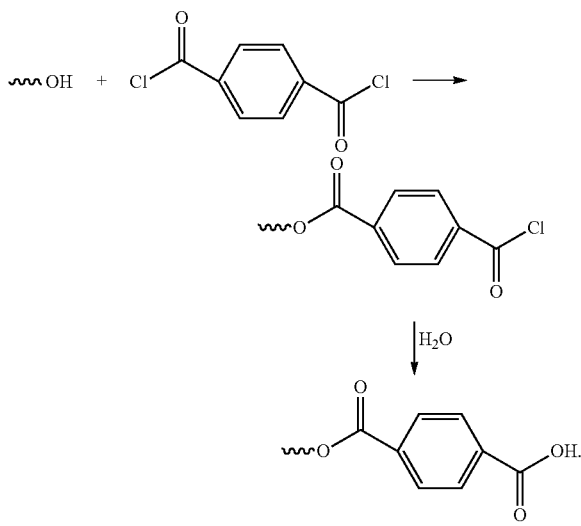

In some embodiments of the method provided herein, the degradable and non-degradable blocks comprise carbonyl chloride ends and said carbonyl chloride are converted into carboxylic acid before said step (c).

DETAILED DESCRIPTION OF THE INVENTION

I. Definitions and Abbreviations

Unless defined otherwise, all technical and scientific terms used herein generally have the same meaning as commonly understood by one of ordinary skill in the art to which this invention belongs. Generally, the nomenclature used herein and the laboratory procedures in cell culture, molecular genetics, organic chemistry and nucleic acid chemistry and hybridization are those well known and commonly employed in the art. Standard techniques are used for nucleic acid and peptide synthesis. The techniques and procedures are generally performed according to conventional methods in the art and various general references, which are provided throughout this document. The nomenclature used herein and the laboratory procedures in analytical chemistry, and organic synthetic described below are those well known and commonly employed in the art. Standard techniques, or modifications thereof, are used for chemical syntheses and chemical analyses.

The term "alkyl," by itself or as part of another substituent, means, unless otherwise stated, a straight or branched chain, or cyclic hydrocarbon radical, or combination thereof, which may be fully saturated, mono- or polyunsaturated and can include di- and multivalent radicals, having the number of carbon atoms designated (i.e. $C_1$-$C_{10}$ means one to ten carbons). Examples of saturated hydrocarbon radicals include, but are not limited to, groups such as methyl, ethyl, n-propyl, isopropyl, n-butyl, t-butyl, isobutyl, sec-butyl, cyclohexyl, (cyclohexyl)methyl, cyclopropylmethyl, homologs and isomers of for example, n-pentyl, n-hexyl, n-heptyl, n-octyl, and the like. An unsaturated alkyl group is one having one or more double bonds or triple bonds. Examples of unsaturated alkyl groups include, but are not limited to, vinyl, 2-propenyl, crotyl, 2-isopentenyl, 2-(butadienyl), 2,4-pentadienyl, 3-(1,4-pentadienyl), ethynyl, 1- and 3-propynyl, 3-butynyl, and the higher homologs and isomers. The term "alkyl," unless otherwise noted, is also meant to include those derivatives of alkyl defined in more detail below, such as "heteroalkyl." Alkyl groups, which are limited to hydrocarbon groups, are termed "homoalkyl".

The term "alkylene" by itself or as part of another substituent means a divalent radical derived from an alkane, as exemplified, but not limited, by —$CH_2CH_2CH_2CH_2$—, and further includes those groups described below as "heteroalkylene." Typically, an alkyl (or alkylene) group will have from 1 to 24 carbon atoms, with those groups having 10 or fewer carbon atoms being preferred in the present invention. A "lower alkyl" or "lower alkylene" is a shorter chain alkyl or alkylene group, generally having eight or fewer carbon atoms.

The terms "alkoxy," "alkylamino" and "alkylthio" (or thioalkoxy) are used in their conventional sense, and refer to those alkyl groups attached to the remainder of the molecule via an oxygen atom, an amino group, or a sulfur atom, respectively.

The term "heteroalkyl," by itself or in combination with another term, means, unless otherwise stated, a stable straight or branched chain, or cyclic hydrocarbon radical, or combinations thereof, consisting of the stated number of carbon atoms and at least one heteroatom selected from the group consisting of O, N, Si and S, and wherein the nitrogen and sulfur atoms may optionally be oxidized and the nitrogen heteroatom may optionally be quaternized. The heteroatom(s) O, N and S and Si may be placed at any interior position of the heteroalkyl group or at the position at which the alkyl group is attached to the remainder of the molecule. Examples include, but are not limited to, —$CH_2$—$CH_2$—O—$CH_3$, —$CH_2$—$CH_2$—NH—$CH_3$, —$CH_2$—$CH_2$—N($CH_3$)—$CH_3$, —$CH_2$—S—$CH_2$—$CH_3$, —$CH_2$—$CH_2$, —S(O)—$CH_3$, —$CH_2$—$CH_2$—S(O)$_2$—$CH_3$, —CH=CH—O—$CH_3$, —Si($CH_3$)$_3$, —$CH_2$—CH=N—O$CH_3$, and —CH=CH—N($CH_3$)—$CH_3$. Up to two heteroatoms may be consecutive, such as, for example, —$CH_2$—NH—O$CH_3$ and —$CH_2$—O—Si($CH_3$)$_3$. Similarly, the term "heteroalkylene" by itself or as part of another substituent means a divalent radical derived from heteroalkyl, as exemplified, but not limited by, —$CH_2$—$CH_2$—S—$CH_2$—$CH_2$— and —$CH_2$—S—$CH_2$—$CH_2$—NH—$CH_2$—. For heteroalkylene groups, heteroatoms can also occupy either or both of the chain termini (e.g., alkyleneoxy, alkylenedioxy, alkyleneamino, alkylenediamino, and the like). Still further, for alkylene and heteroalkylene linking groups, no orientation of the linking group is implied by the direction in which the formula of the linking group is written. For example, the formula —C(O)$_2$R'— represents both —C(O)$_2$R'— and —R'C(O)$_2$—.

In general, an "acyl substituent" is also selected from the group set forth above. As used herein, the term "acyl substituent" refers to groups attached to, and fulfilling the valence of a carbonyl carbon that is either directly or indirectly attached to the polycyclic nucleus of the compounds of the present invention.

The terms "cycloalkyl" and "heterocycloalkyl", by themselves or in combination with other terms, represent, unless otherwise stated, cyclic versions of "alkyl" and "heteroalkyl", respectively. Additionally, for heterocycloalkyl, a heteroatom can occupy the position at which the heterocycle is attached to the remainder of the molecule. Examples of cycloalkyl include, but are not limited to, cyclopentyl, cyclohexyl, 1-cyclohexenyl, 3-cyclohexenyl, cycloheptyl, and the like. Examples of heterocycloalkyl include, but are not limited to, 1-(1,2,5,6-tetrahydropyridyl), 1-piperidinyl, 2-piperidinyl, 3-piperidinyl, 4-morpholinyl, 3-morpholinyl, tetrahydrofuran-2-yl, tetrahydrofuran-3-yl, tetrahydrothien-2-yl, tetrahydrothien-3-yl, 1-piperazinyl, 2-piperazinyl, and the like.

The terms "halo" or "halogen," by themselves or as part of another substituent, mean, unless otherwise stated, a fluorine, chlorine, bromine, or iodine atom. Additionally, terms such as "haloalkyl," are meant to include monohaloalkyl and polyhaloalkyl. For example, the term "halo($C_1$-$C_4$)alkyl" is mean to include, but not be limited to, trifluoromethyl, 2,2,2-trifluoroethyl, 4-chlorobutyl, 3-bromopropyl, and the like.

The term "aryl" means, unless otherwise stated, a polyunsaturated, aromatic, hydrocarbon substituent, which can be a single ring or multiple rings (preferably from 1 to 3 rings), which are fused together or linked covalently. The term "heteroaryl" refers to aryl groups (or rings) that contain from one to four heteroatoms selected from N, O, and S, wherein the nitrogen and sulfur atoms are optionally oxidized, and the nitrogen atom(s) are optionally quaternized. A heteroaryl group can be attached to the remainder of the molecule through a heteroatom. Non-limiting examples of aryl and heteroaryl groups include phenyl, 1-naphthyl, 2-naphthyl, 4-biphenyl, 1-pyrrolyl, 2-pyrrolyl, 3-pyrrolyl, 3-pyrazolyl, 2-imidazolyl, 4-imidazolyl, pyrazinyl, 2-oxazolyl, 4-oxazolyl, 2-phenyl-4-oxazolyl, 5-oxazolyl, 3-isoxazolyl, 4-isoxazolyl, 5-isoxazolyl, 2-thiazolyl, 4-thiazolyl, 2-furyl, 3-furyl, 2-thienyl, 3-thienyl, 2-pyridyl, 3-pyridyl, 4-pyridyl, 2-pyrimidyl, 4-pyrimidyl, 5-benzothiazolyl, purinyl, 2-benzimidazolyl, 5-indolyl, 1-isoquinolyl, 5-isoquinolyl, 2-quinoxalinyl, 5-quinoxalinyl, 3-quinolyl, and 6-quinolyl. Substituents for each of the above noted aryl and heteroaryl ring systems are selected from the group of acceptable substituents described below.

For brevity, the term "aryl" when used in combination with other terms (e.g., aryloxy, arylthioxy, arylalkyl) includes both aryl and heteroaryl rings as defined above. Thus, the term "arylalkyl" is meant to include those radicals in which an aryl group is attached to an alkyl group (e.g., benzyl, phenethyl, pyridylmethyl and the like) including those alkyl groups in which a carbon atom (e.g., a methylene group) has been replaced by, for example, an oxygen atom (e.g., phenoxymethyl, 2-pyridyloxymethyl, 3-(1-naphthyloxy)propyl, and the like).

Each of the above terms (e.g., "alkyl," "heteroalkyl," "aryl" and "heteroaryl") include both substituted and unsubstituted forms of the indicated radical. Preferred substituents for each type of radical are provided below.

Substituents for the alkyl, and heteroalkyl radicals (including those groups often referred to as alkylene, alkenyl, heteroalkylene, heteroalkenyl, alkynyl, cycloalkyl, heterocycloalkyl, cycloalkenyl, and heterocycloalkenyl) are generally referred to as "alkyl substituents" and "heteroalkyl substituents," respectively, and they can be one or more of a variety of groups selected from, but not limited to: —OR', =O, =NR', =N—OR', —NR'R", —SR', -halogen, —SiR'R"R"', —OC(O)R', —C(O)R', —CO$_2$R', —CONR'R", —OC(O)NR'R", —NR"C(O)R', —NR'—C(O)NR"R"', —NR"C(O)$_2$R', —NR—C(NR'R"R"')=NR"", —NR—C(NR'R")=NR"', —S(O)R', —S(O)$_2$R', —S(O)$_2$NR'R", —NRSO$_2$R', —CN and —NO$_2$ in a number ranging from zero to (2m'+1), where m' is the total number of carbon atoms in such radical. R', R", R"' and R"" each preferably independently refer to hydrogen, substituted or unsubstituted heteroalkyl, substituted or unsubstituted aryl, e.g., aryl substituted with 1-3 halogens, substituted or unsubstituted alkyl, alkoxy or thioalkoxy groups, or arylalkyl groups. When a compound of the invention includes more than one R group, for example, each of the R groups is independently selected as are each R', R", R"' and R"" groups when more than one of these groups is present. When R' and R" are attached to the same nitrogen atom, they can be combined with the nitrogen atom to form a 5-, 6-, or 7-membered ring. For example, —NR'R" is meant to include, but not be limited to, 1-pyrrolidinyl and 4-morpholinyl. From the above discussion of substituents, one of skill in the art will understand that the term "alkyl" is meant to include groups including carbon atoms bound to groups other than hydrogen groups, such as haloalkyl (e.g., —CF$_3$ and —CH$_2$CF$_3$) and acyl (e.g., —C(O)CH$_3$, —C(O)CF$_3$, —C(O)CH$_2$OCH$_3$, and the like).

Similar to the substituents described for the alkyl radical, the aryl substituents and heteroaryl substituents are generally referred to as "aryl substituents" and "heteroaryl substituents," respectively and are varied and selected from, for example: halogen, —OR', =O, =NR', =N—OR', —NR'R", —SR', -halogen, —SiR'R"R"', —OC(O)R', —C(O)R', —CO$_2$R', —CONR'R", —OC(O)NR'R", —NR"C(O)R', —NR'—C(O)NR"R"', —NR"C(O)$_2$R', —NR—C(NR'R")=NR"', —S(O)R', —S(O)$_2$R', —S(O)$_2$NR'R", —NRSO$_2$R', —CN and —NO$_2$, —R', —N$_3$, —CH(Ph)$_2$, fluoro($C_1$-$C_4$)alkoxy, and fluoro($C_1$-$C_4$)alkyl, in a number ranging from zero to the total number of open valences on the aromatic ring system; and where R', R", R"' and R'''' are preferably independently selected from hydrogen, ($C_1$-$C_8$)alkyl and heteroalkyl, unsubstituted aryl and heteroaryl, (unsubstituted aryl)-($C_1$-$C_4$)alkyl, and (unsubstituted aryl)oxy-($C_1$-$C_4$)alkyl. When a compound of the invention includes more than one R group, for example, each of the R groups is independently selected as are each R', R'', R''' and R'''' groups when more than one of these groups is present.

Two of the aryl substituents on adjacent atoms of the aryl or heteroaryl ring may optionally be replaced with a substituent of the formula -T-C(O)—(CRR')$_q$—U—, wherein T and U are independently —NR—, —O—, —CRR'— or a single bond, and q is an integer of from 0 to 3. Alternatively, two of the substituents on adjacent atoms of the aryl or heteroaryl ring may optionally be replaced with a substituent of the formula -A-($CH_2$)$_r$—B—, wherein A and B are independently —CRR'—, —O—, —NR—, —S—, —S(O)—, —S(O)$_2$—, —S(O)$_2$NR'— or a single bond, and r is an integer of from 1 to 4. One of the single bonds of the new ring so formed may optionally be replaced with a double bond. Alternatively, two of the substituents on adjacent atoms of the aryl or heteroaryl ring may optionally be replaced with a substituent of the formula —(CRR')$_s$—X—(CR''R''')$_d$—, where s and d are independently integers of from 0 to 3, and X is —O—, —NR'—, —S—, —S(O)—, —S(O)$_2$—, or —S(O)$_2$NR'—.

The substituents R, R', R'' and R''' are preferably independently selected from hydrogen or substituted or unsubstituted ($C_1$-$C_6$) alkyl.

As used herein, the term "heteroatom" includes oxygen (O), nitrogen (N), sulfur (S), phosphorus (P) and silicon (Si).

II. The Compositions

In one aspect, the present invention provides condensation polymers comprising degradable blocks of short chain length of poly hydroxyl acids as joints of non-degradable polymer chains. In general, such polymers retains the mechanical strength of non-degradable blocks (the major blocks of the polymer) but are easily degraded at their degradable blocks (the location of joints) and therefore the long chain polymers will be degraded back to non-degradable short chains.

In some embodiments, the present invention provides degradable blocks or degradable segments having the structure according to Formula (III):

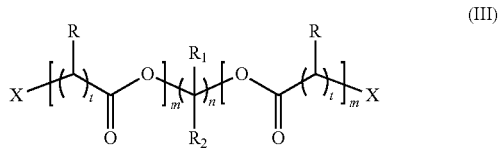

wherein t, m, n are integers; X is Cl, Br, I, $NH_2$—, HO—, R'OCO—$C_6H_4$—COO— (where R' is H, $CH_3$, $C_2H_5$ or any other alkyls) or other polymer chains, and $R_1$, $R_2$ are members independently selected in each structural units from H, substituted or unsubstituted alkyl, substituted or unsubstituted heteroalkyl, substituted or unsubstituted cycloalkyl, substituted or unsubstituted heterocycloalkyl, substituted or unsubstituted aryl and substituted or unsubstituted heteroaryl, substituted or unsubstituted alkoxy, ester, nitro, amine, amide, or thiol. In some embodiments, X is removed when incorporated into polymers.

In some embodiments, the present invention provides degradable blocks or degradable segments having the structure according to Formula (IV):

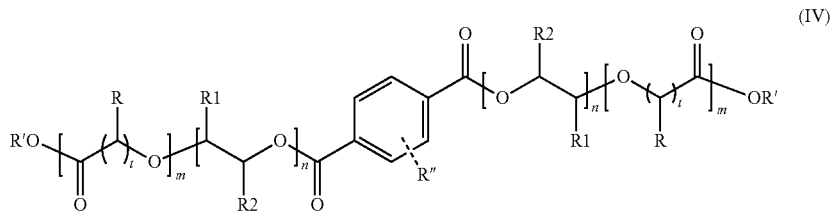

wherein t, m, n are integers; R, $R_1$, $R_2$ are alkyls ($CH_3$, $C_2H_5$ . . . ); R' is H or alkyls ($CH_3$, $C_2H_5$ . . . ); R'' is any substitute groups; and R' is H, substituted or unsubstituted alkyl, substituted or unsubstituted heteroalkyl, substituted or unsubstituted cycloalkyl, substituted or unsubstituted heterocycloalkyl, substituted or unsubstituted aryl and substituted or unsubstituted heteroaryl, substituted or unsubstituted alkoxy, ester, nitro, amine, amide, or thiol.

In some embodiments, the non-degradable blocks are polyester (exclude the polyhydroxyl acids, which are degradable), with functional groups to react with degradable short chains. By "non-degradable" herein is meant that the rate of hydrolysis is much slower then that of polyhydroxy acids, rather than absolutely no degradation.

In one aspect, the present invention provides non-degradable polymers with degradable blocks. These polymers comprise of both degradable blocks and non-degradable blocks such as Formulae (Ia) and (IIb):

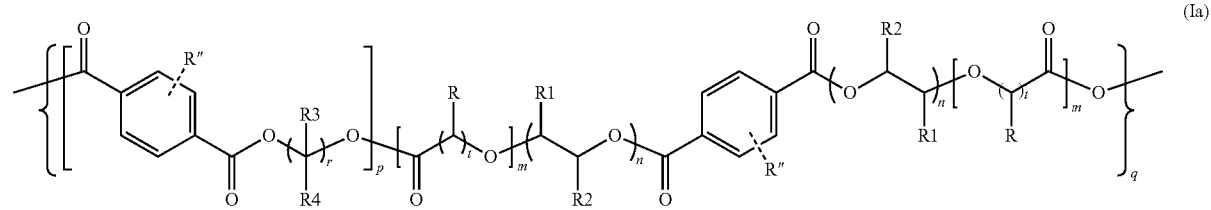

Non degradable polyester blocks          degradable blocks

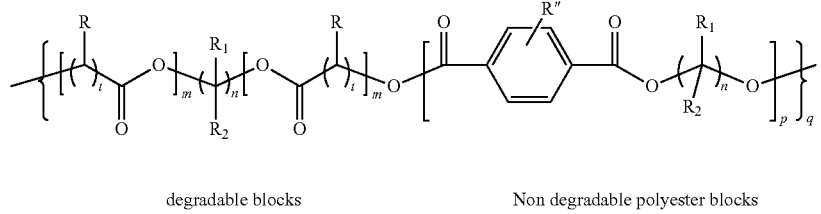

degradable blocks      Non degradable polyester blocks wherein t, m, n, p, q are integers; R, $R_1$, $R_2$, $R_3$, $R_4$, R" are members independently selected in each structural units from H, substituted or unsubstituted alkyl, substituted or unsubstituted heteroalkyl, substituted or unsubstituted cycloalkyl, substituted or unsubstituted heterocycloalkyl, substituted or unsubstituted aryl and substituted or unsubstituted heteroaryl, substituted or unsubstituted alkoxy, ester, nitro, amine, amide, or thiol.

In some embodiments, R, $R_1$, $R_2$, R" are independently $C_1$ to $C_{10}$ alkyls.

In some embodiments, the degradable blocks are short chain poly hydroxyacids with functional groups at both ends to react with non degradable-blocks.

In some embodiments, the polymers comprise degradable blocks according to Formulae (IIIa):

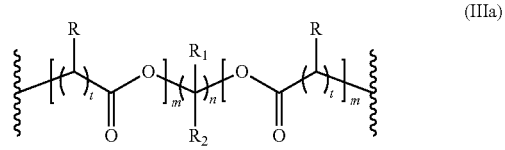

wherein t, m, n are integers; and R, $R_1$, $R_2$ are members independently selected in each structural units from H, substituted or unsubstituted alkyl, substituted or unsubstituted heteroalkyl, substituted or unsubstituted cycloalkyl, substituted or unsubstituted heterocycloalkyl, substituted or unsubstituted aryl and substituted or unsubstituted heteroaryl, substituted or unsubstituted alkoxy, ester, nitro, amine, amide, or thiol.

In some embodiments, the polymers comprise degradable blocks according to Formulae (IV):

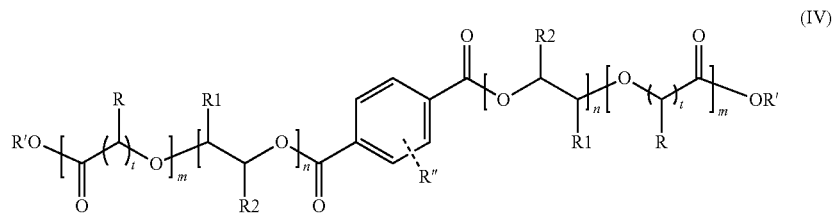

wherein t, m, n are integers; R, $R_1$, $R_2$, are alkyls ($CH_3$, $C_2H_5$ ...); R" is any substitute groups; and R' is H, substituted or unsubstituted alkyl, substituted or unsubstituted heteroalkyl, substituted or unsubstituted cycloalkyl, substituted or unsubstituted heterocycloalkyl, substituted or unsubstituted aryl and substituted or unsubstituted heteroaryl, substituted or unsubstituted alkoxy, ester, nitro, amine, amide, or thiol.

The ratio between the non-degradable blocks and the degradable blocks in the polymers can vary. In some embodiments, the polymers comprises non-degradable blocks as major components (from 50% to 100% weight percentage) and degradable blocks as minor components (from 0% to 50% weight percentage).

III. Method of Making

In another aspect, the present invention provides methods of manufacturing polymers. The method of manufacturing polymers with degradable blocks in present invention comprises three major modules: (a) synthesis of degradable hydroxyl acids blocks, (b) synthesis of non-degradable polymers, and (c) joining both degradable blocks and non degradable polymers together.

(a). Synthesis of Degradable Hydroxyl Acids Blocks

In one aspect, the present invention provides methods of synthesizing degradable hydroxyl acids blocks, such as the process in Scheme Ia or Ib:

Scheme Ia. Synthesis of glycol contained degradable blocks

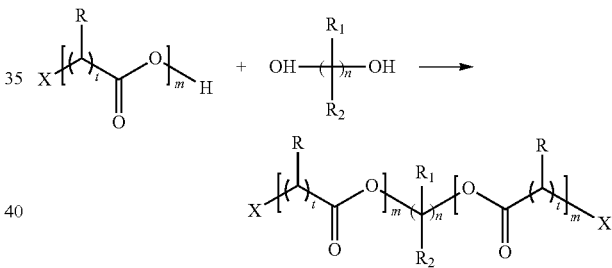

Scheme Ib. Synthesis of glycol contained degradable blocks

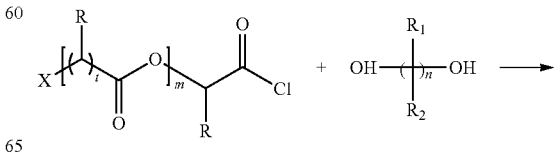

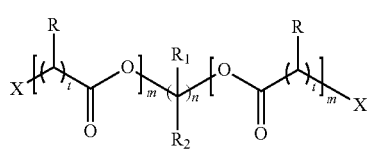

In some embodiments, a poly hydroxyl acids oligomer according to Formula (II) is first synthesized according to Huang's methods (U.S. Application No. 61/054,218) and/or Hermes and Huang's method (U.S. Pat. No. 5,349,047), both are herein incorporated by reference in their entirety. Formula (II):

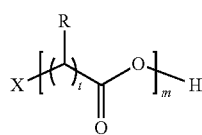

(II)

wherein t, m are integers; X is Cl, Br, I, $NH_2$—, or HO—, $R'OCO-C_6H_4-COO-$ (where R' is H, $CH_3$, $C_2H_5$ or any other alkyls), and R is H, substituted or unsubstituted alkyl, substituted or unsubstituted heteroalkyl, substituted or unsubstituted cycloalkyl, substituted or unsubstituted heterocycloalkyl, substituted or unsubstituted aryl and substituted or unsubstituted heteroaryl, substituted or unsubstituted alkoxy, ester, nitro, amine, amide, or thiol.

In some embodiments, R is $C_1$ to $C_{10}$ alkyls.

The poly hydroxyl acids oligomer then reacts with ethylene glycol (EG) to form a new oligomer with both ends of halide, hydroxy or amine (Formula (III)) (Scheme I) or with terephthalic acid (TPA) to form a new oligomer with both ends of carboxylic acids or carboxylate esters (Formula (IV)) (Scheme II).

Scheme II (Synthesis of TPA contained degradable blocks):

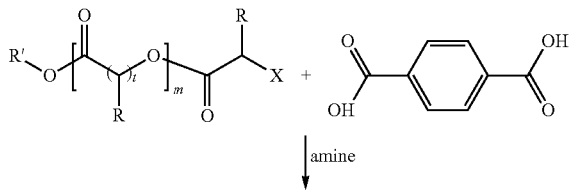

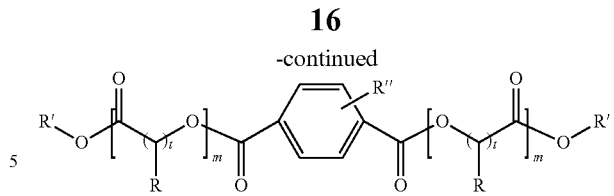

The poly hydroxyl acids oligomer halide then reacts with ethylene glycol (EG) to form a new oligomer with end of hydroxy or which then reacts with terephthalic acid (TPA) to form a new oligomer with both ends of carboxylic acids or carboxylate esters (Formula (IV)) (Scheme IIa).

Scheme IIa (Synthesis of TPA contained degradable blocks):

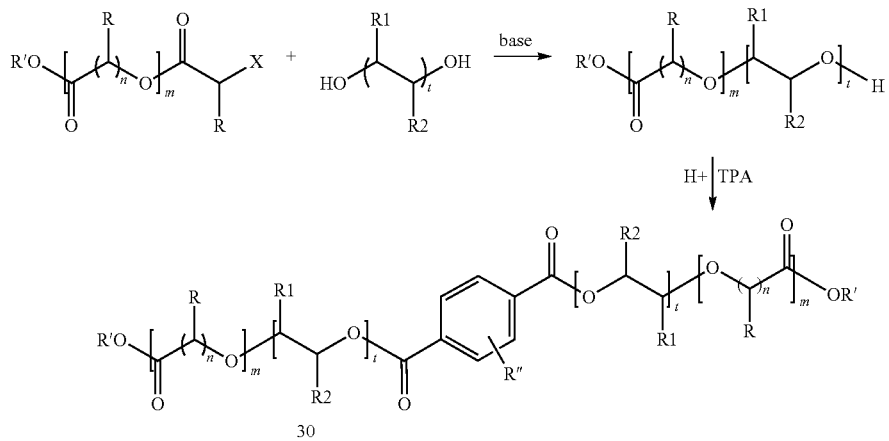

The reaction of oligomer with diol or dicarboxylic acid involved here is esterification reaction which can be accomplished by react carbonyl chloride of polyhydroxyl acid oligomers (Formula (V)) with ethylene glycol or directly react the carboxylic acid group of oligomer to ethylene glycol with acid catalysts of ion exchange resin. In the case of oligomer reacting to terephthalic acid (TPA), it can be accomplished by reacting TPA with halocarboxylic acid oligomer and amines such as triethylamine or ethyldiisopropylamine.

In some embodiments, the polyhydroxyl acid oligomers have the structure according to Formula (V):

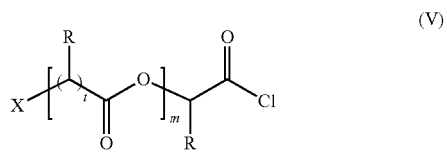

(V)

wherein t, m are integers; X is Cl, Br, I, $NH_2$—, or HO—; and R is substituted or unsubstituted alkyl, substituted or unsubstituted heteroalkyl, substituted or unsubstituted cycloalkyl, substituted or unsubstituted heterocycloalkyl, substituted or unsubstituted aryl and substituted or unsubstituted heteroaryl, substituted or unsubstituted alkoxy, ester, nitro, amine, amide, or thiol.

In some embodiment, glycol contained degradable blocks (Formula (III)) is reacted with TPA or terephthalate according to the Scheme III to form the blocks with carboxylic acid or carboxylate at both ends (Formula (IIIb):

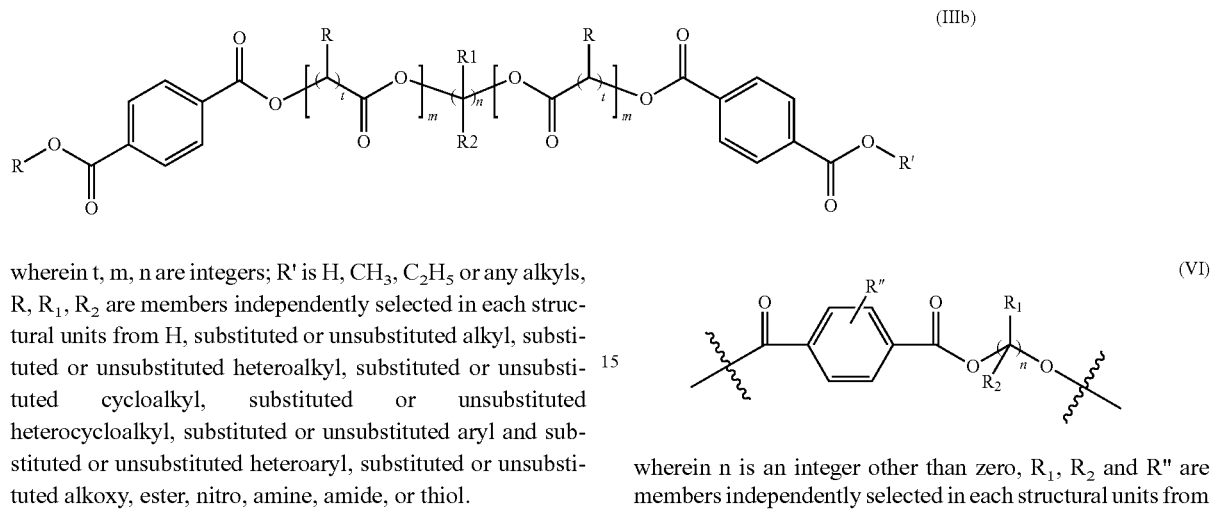

wherein t, m, n are integers; R' is H, CH$_3$, C$_2$H$_5$ or any alkyls, R, R$_1$, R$_2$ are members independently selected in each structural units from H, substituted or unsubstituted alkyl, substituted or unsubstituted heteroalkyl, substituted or unsubstituted cycloalkyl, substituted or unsubstituted heterocycloalkyl, substituted or unsubstituted aryl and substituted or unsubstituted heteroaryl, substituted or unsubstituted alkoxy, ester, nitro, amine, amide, or thiol.

Scheme III:

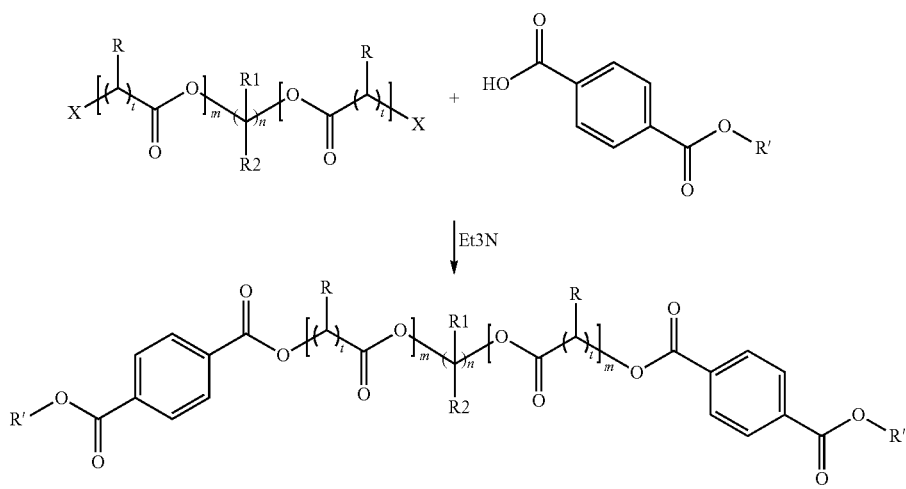

(b). Synthesis of Non-Degradable Polymers

The non-degradable blocks, such as polyester (exclude the polyhydroxyl acids, which are degradable), polycarbonate or polyamide are synthesized according to methods known in the art. In general, the non-degradable blocks have functional hydroxyl group at the ends of polymer chains (generally with very small amount of carboxylic acid as the end group), which are reactive with degradable short chains.

To control the molecular weight or degree of polymerization of non-degradable polymer blocks, the time and pressure of traditional melting process can be adjusted. The alternative way is to react terephthaloyl chloride with diol in various ratio for two different monomers to control the degree of polymerization (DP) and the end group (hydroxyl ended or carbonyl chloride ended).

In some embodiment, the non-degradable blocks have the structure according to Formula (VI):

wherein n is an integer other than zero, R$_1$, R$_2$ and R" are members independently selected in each structural units from H, substituted or unsubstituted alkyl, substituted or unsubstituted heteroalkyl, substituted or unsubstituted cycloalkyl, substituted or unsubstituted heterocycloalkyl, substituted or unsubstituted aryl and substituted or unsubstituted heteroaryl, substituted or unsubstituted alkoxy, ester, nitro, amine, amide, or thiol.

In some embodiment, the end group of the non-degradable blocks need to be modified into carboxylic acid, if the blocks will be joined with Formula (III). Scheme IV shows the reaction of the modification:

Scheme IV:

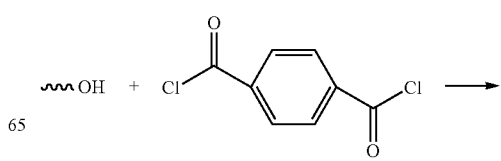

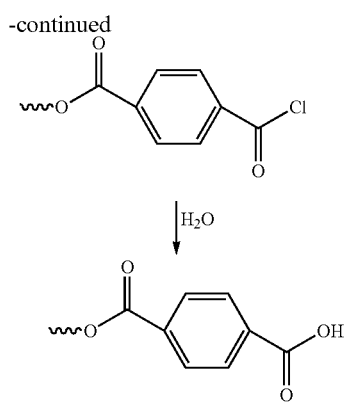

The solvent used in this reaction is 1,1,2,2-tetrachloroethane or any other suitable organic solvent which can dissolve the non-degradable blocks at reflux temperature or below.

In case of carbonyl chloride ended blocks, direct hydrolysis converts carbonyl chloride into carboxylic acid.

(c). Joining Both Degradable Blocks and Non-Degradable Polymers

In another aspect, the present invention provides methods for joining non-degradable polymers with degradable blocks together to obtain high molecular weight polymers.

In conventional polyester manufacturing, copolyesters are typically produced by two different routes: ester exchange plus polycondensation (the DMT process) or direct esterification plus polycondensation (the direct esterification process). Either of these routes comprises two stages: In the first stage a polymer ester is formed by polymerization the monomers at about 180° C. to 230° C. The second stage, referred as post polymerization reaction, is carried out at a higher temperature (280° C.) or other process to obtain higher molecular weight polyester.

are generally synthesized first with commercial melting process of polycondensation (e.g. 2~4 hours at 275° C. under vacuum and then the degradable blocks is added and the reaction continues at 275° C. for another 2~4 hours under vacuum.) Scheme V shows one of example reaction in this process when the byproduct $H_2O$ is removed under vacuum. Similar ester exchange reactions can be carried out in the melting polymerization by removal of alcohols under vacuum.

Scheme V:

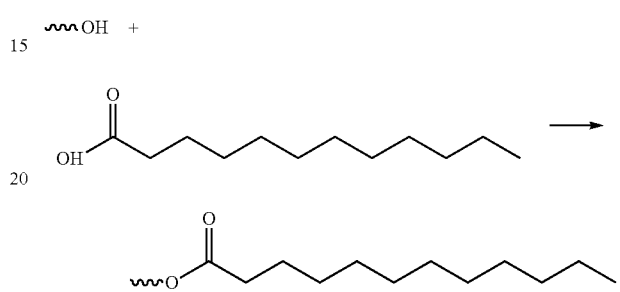

If the distribution of degradable blocks in the final polymer chains is not a concern, the degradable blocks generally can be added to monomers of non-degradable polymer at the beginning to form degradable blocks contained polymer through mature industrial PET manufacture process, such as those shown in Scheme VI. The distribution of degradable blocks in polymers obtained with such approach will be random but will still degradable at their degradable blocks when they are exposed to proper environments such as basic solution.

Scheme VI:

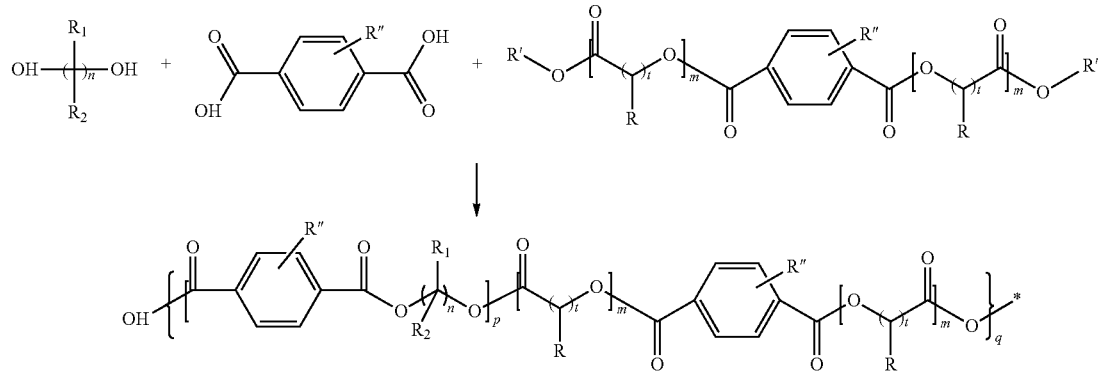

Instead of move on to second stage, the present invention utilizes the degradable blocks to join the polyesters produced in the first stage directly.

In some embodiments, when non-degradable blocks are ended with hydroxyl group from the melting reaction process, carboxylic acid or carboxylate ended degradable blocks (formula IIIA, formula IV) can be added into the reactor of melting process directly at beginning or middle of the reaction. To ensure the degradable blocks are uniformly distributed in the overall polymer chains, the non-degradable blocks In some embodiments, the joint degradable segment is not ended with carboxylic acid and therefore we need to convert the end groups of non-degradable blocks as described herein.

The joining reactions here again are esterification process. Although there are many possible processes to esterification, a very convenient method is to follow the reactions between α-halocarboxylate and carboxylic acid as disclosed in Huang's method (U.S. Patent Application No. 61/054,218), the disclosure of which is incorporated by reference in its entirety. In order to obtain high molecular weight polymer, the stoichiometry between two reactants, the degradable blocks and short chain non-degradable polymers with carboxylic acid as end group here, must be controlled very well.

Generally, it is difficulty to calculate the stoichiometry of short chain non-degradable polymers because of the length diversity of polymer chain. However, due to the acidic end groups in short chain polymers, through titration of the content of acid groups in the polymer solution, we can finger out the acid equivalents per gram and therefore know exactly how much degradable halo blocks we need to form longer copolymer.

IV. Applications

The polymers provided herein can find use in a variety of applications, such as packaging bottles for beverages, food packing films, shopping bags and other containers.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference for all purposes.

EXAMPLES

Example 1

Synthesis of ethylene di-bromoacetylate. To a solution of bromoacetyl chloride (TCI, 95 gram, 0.6 mole) in 100 ml dry ethyl acetate was added dropewisely anhydrous ethylene glycol (Sigma-Aldrich, 12.41 gram, 0.2 mole). The solution was stirred at 70° C. under $N_2$ protection for 16 hours and then washed with 200 ml DI water and 200 ml brine. The solvent was removed in vacuum after drying with anhydrous $MgSO_4$. The crude product was vacuum pumper for 24 hours and then vacuum distilled. ~100° C./3 mm Hg fraction was collected. 35 gram product was obtained, yield 58%. $^1$HNMR ($CDCl_3$, 400 Mz) δ 4.365 (S, 4H); δ 3.830 (S, 4H).

Example 2

Synthesis of ethylene di-bromoacetylate (BrGEGBr). To a 250 ml round bottom flask were placed bromoacetic acid (Sigma-Aldrich, 69.5 g, 0.5 mole), ethylene glycol (Sigma-Aldrich, 15.44 g, 0.25 mole), Dowex C-211, H$^+$ form cation ion exchange resin (4 g) and benzene (100 ml). The mixture was refluxed with Dean Stark Trap for 16 hours, record water trapped. When there was no more water come out, the solution was cool down to room temperature and the resin was filtrated out. Water was measured (8.5 ml). The solvent benzene was removed in vacuum. The product was vacuum distilled at about 3 mm Hg, ~100 C/3 mm Hg fraction was collected (40 g), yield 53%. $^1$HNMR ($CDCl_3$, 400 Mz) δ 4.365 (S, 4H); δ 3.830 (S, 4H).

Example 3

Synthesis of bromoacetylate glycolic acid (BrGG acid). To a 250 ml round bottom flask were placed bromoacetic acid (Sigma-Aldrich, 69.5 g, 0.5 mole), glycolic acid (Sigma-Aldrich, 37.52 g, 0.5 mole), Dowex C-211, H$^+$ form cation ion exchange resin (4 g) and benzene (100 ml). The mixture was refluxed with Dean Stark Trap for 13 hours, record water trapped. When there was no more water come out, the solution is cool down to room temperature and the resin is filtrated out. Water was measured (11 ml). The solvent benzene was removed in vacuum. The product was vacuum distilled at about 3 mm Hg, 105-108° C./3 mm Hg fraction was collected (12.9 g), yield 13.1% (the major product were poly glycolic acid oligomers). $^1$HNMR ($CDCl_3$, 400 Mz) δ 4.850 (S, 2H); δ 3.950 (S, 2H).

Example 4

Synthesis of Ethylene Bromoacetylate Glycolate (BrGGEGGBr)

To a 250 ml round bottom flask were placed BrGG acid (from Example III, 29.55 g, 0.15 mole), ethylene glycol (Sigma-Aldrich, 7.45 g, 0.12 mole), Dowex C-211, form cation ion exchange resin (4 g) and benzene (100 ml). The mixture was refluxed with Dean Stark Trap for 16 hours, record water trapped. When there was no more water come out, the solution was cool down to room temperature and the resin was filtrated out. Water was measured (4.3 ml). The filtrate solution is washed with Sat. $NaHCO_3$ aq solution (100 ml) to remove excess BrGG. The solvent benzene was removed in vacuum after dried with MgSO4.

Example 5

Synthesis of PET Oligomer

To a 250 ml two neck round bottom flask equipped with condenser are placed terephthalic acid chloride (64.015 g, 98%, 0.309 mole) and 150 ml toluene, ethylene glycol (18.658 g, 99.8%, 0.3 mole) in 50 ml toluene is dropwisely added at 80° C. (oil bath 100° C.). After completion of addition, the mixture is refluxed under $N_2$ for 16 hours. The solvent is removed in vacuum and the residues are heated to 120° C. under vacuum for 3 hours. The residues are stirred with $H_2O$ (400 ml) for 3 hours, check pH value shows acidic. The solid product is filtrated and dried at 120° C. overnight.

Example 6

Synthesis of PET Oligomer

To a 250 ml stainless steel bomb are placed Bis(2-hydroxyethyl)terephthalate (BHET, Sigma-Aldrich, 30 g, 0.118 mole), 350 ppm Sb2O3 (Alfa Aesar) and a magnetic stirring bar. The system is purged with N2/Vacuum three times and then typically heated to 275° C. in 30 min. The System is kept at 275° C. under vacuum (3 mm Hg) for a time period from 2~5 hours. The bomb is then opened and dry ice is added into the bomb to cool down the melt to room temperature quickly. The bulk solid is roughly grinded into small pieces and the viscosity is measured in phenol/1,1,2,2-tetrachloroethane (60/40 weight ratio) according to SPI's (The Society of Plastic Industry) standard PET measurement procedure. The Table 1 summarized the IV (intrinsic viscosity) for various reaction times.

| Time of Reaction (min) | IV |
| --- | --- |
| 120 | 0.08 |
| 150 | 0.12 |
| 180 | 0.18 |
| 240 | 0.43 |

Example 7

Conversion the End Group of PET Oligomers into Carboxylic Acid

PET oligomers (IV=0.12, 20 gram from Example 6) is placed in round bottom flask with 1,1,2,2-tetrachloroethane (Alfa Aesar, 100 ml) and Terephthaloyl chloride (sigma-Aldrich, 10 g). The solution is refluxed for 16 hours with stirring and then is cooled down to room temperature and diluted with 200 ml ethyl ether. The solid product is collected and dried after filtration, grinded and placed into DI water (400 ml) and 150 ml acetonitrile. The mixture is stirred for 5 hours and then pH is adjusted to 7~8 with HCl and stirred for 1 more hour. The white solid is collected and dried at 120° C. for >3 hours after filtration.

Example 8

Synthesis of PET Polymers with GEG Blocks

To a solution of PET oligomer from Example V (11.088 g, 0.01 mole) and Et3N (2.0238 g, 0.02 mole) in 90 ml anhydrous acetonitrile is added dropwisely a solution of BrGEGBr (3.0394 g, 0.01 mole) in 10 ml anhydrous acetoniltrile. The mixture is stirred at room temperature for 48 hours. The solution is poured into 500 ml DI water, stirred at room temperature for two hours, filtrated and dried at 110° C. overnight. 11.69 g product is obtained. Yield 93.5%.

Example 9

Synthesis of PET Polymers with GGEGG Blocks

To a solution of PET oligomer from Example 5 (11.088 g, 0.01 mole) and Et3N (2.0238 g, 0.02 mole) in 90 ml anhydrous acetonitrile is added dropwisely a solution of BrGGEGGBr (4.200 g, 0.01 mole) in 10 ml anhydrous acetoniltrile. The mixture is stirred at room temperature for 48 hours. The solution is poured into 500 ml DI water, stirred at room temperature for two hours, filtrated and dried at 110° C. overnight.

Example 10

Synthesis of PET Polymers with Degradable Blocks

PET oligomers (IV=0.18, 20 gram from Example 6) and degradable blocks (repeat unit molar ration 10:1) are placed in the stainless steel bomb with a magnetic stirring bar and N2/vacuum purged three times. The system is placed in a 275° C. oil bath for 3 hours with stirring under vacuum. The bomb is then opened and added with dry ice to cool down the melt to room temperature quickly. The bulk solid is roughly grinded into small pieces and the viscosity is measured in phenol/1,1,2,2-tetrachloroethane (60/40 weight ratio) according to SPI's (The Society of Plastic Industry) standard PET measurement procedure. The Table 2 summarized the IV (intrinsic viscosity) for various reaction times.

Example 11

Synthesis of MeGTGMe (Formula (IV))

To a solution of TPA (Sigma-Aldrich, 33.9 g, 98%, 0.2 mole) and Et3N (40.4 g, 56 ml, 0.4 mole) in 300 ml anhydrous acetonitrile is added dropwisely a solution of methyl bromoacetate (Sigma-Aldrich, 62.44 g, 98%, 0.4 mole) in anhydrous acetonitrile (30 ml). The mixture is stirred at room temperature for 24 hours. The solution is then filtrated to remove the solid Et3N salt. The solvent in filtrate is removed in vacuum and the residues are washed (stirring in) with 1% HCl (500 ml), NaHCO3 sat aq solution (1000 ml) and washed with DI water. The white solid product (48.8 g) is collected after filtration and drying in oven (120° C.) overnight. Mp=107~109° C. Yield 78%.

Example 12

Modification of degradable blocks (MeTGEGTMe).

To a solution of mono-Methyl terephthalate (36.03 g, 0.2 mole) and BrGEGBr (30.4 g, 0.1 mole) in 150 ml anhydrous acetonitrile is added dropwisely triethylamine (20.24 g, 0.2 mole) in a period of one hour at room temperature. The solution was stirred for 20 hours and the white precipitate is filtered out and stirred with 1% HCl (150 ml), NaHCO$_3$ saturated aqueous solution (150 ml) for two hours respectively. The crude product was collected through filtration and dried at 120° C. overnight. The crude product was recrystallized in hot acetonitrile and 37.7 gram final product was collected, Mp 167° C., yield 76%.

Example 13

Synthesis of PET with modified degradable blocks. To a 150 ml round flask was charged with MeTGEGTMe (14.83 g, 0.03 mole), BHET (7.63 g, 0.03 mole) and Sb$_2$O$_3$ (0.03 gram). The mixture was heated to 200° C. under vacuum (20 mmHg) with stirring. The melt was kept at 200° C. for 7 hours and then poured into ice-water.

Example 14

Synthesis of ethylene glycol capped methyl glycolate. To a solution of ethylene glycol (18.62 g, 0.3 mole), ground NaOH (12 g, 0.3 mole) in anhydrous acetonitrile was added dropwisely methyl chloroacetate (32.56 g, 0.3 mole) at 0° C. in a period of 1 hour. The solution was stirred at 0° C. for another 7 hours and the solvent acetonitrile was removed in vacuum.

Example 15

Synthesis of MeGETEGMe. To a 250 ml round bottom flask were placed terephthalic acid (16.6 g, 0.10 mole), ethylene glycol capped methyl glycolate (26.83 g, 0.2 mole), Dowex C-211, H$^+$ form cation ion exchange resin (4 g) and benzene (100 ml). The mixture was refluxed with Dean Stark Trap for 16 hours, record water trapped. When there was no more water come out, the solution was cool down to room temperature and the resin was filtrated out. Water was measured (3.6 ml). The solvent benzene was removed in vacuum. The product was dissolved in ethyl acetate and washed with 1% HCl, saturated NaHCO$_3$ aqueous solution and saturated NaCl aqueous solution. The solvent was remove in vacuum and the solid crud product was collected.

Example 16

Polymerization of MeGETEGMe with BHET. Mixture of MeGETEGMe and BHET (1:1 molar ratio) and Sb$_2$O$_3$ was melting polymerized according to previous examples. At the end of polymerization the polymer melt is poured into the ice-water for quick cooling process.

What is claimed is:

1. A polymer comprising non-degradable blocks and degradable blocks, wherein said polymer has the structure of Formula (Ia):

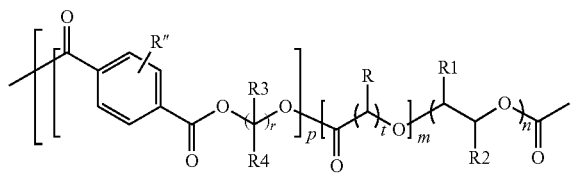
(Ia)

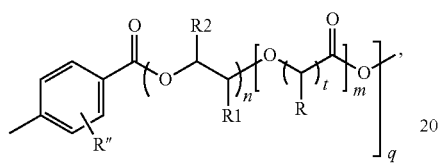

wherein t, m, p, q and r are positive integers, and n is a positive integer; and R, $R_1$, $R_2$, $R_3$, $R_4$, and R" are independently selected in each structural unit from the group consisting of H, substituted alkyl, unsubstituted alkyl, substituted heteroalkyl, unsubstituted heteroalkyl, substituted cycloalkyl, unsubstituted cycloalkyl, substituted heterocycloalkyl, unsubstituted heterocycloalkyl, substituted aryl, unsubstituted aryl, substituted heteroaryl, unsubstituted heteroaryl, substituted alkoxy, unsubstituted alkoxy, ester, nitro, amine, amide, and thiol, wherein m has the value of 1, 2, 3 or 4.

2. A polymer comprising non-degradable blocks and degradable blocks, wherein said polymer has the structure of Formula (Ia):

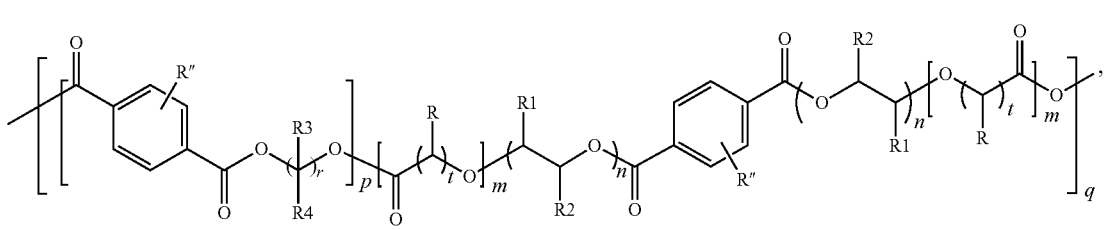
(Ia)

wherein t, m, p, q and r are positive integers, and n is zero or a positive integer; and R, $R_1$, $R_2$, $R_3$, $R_4$, and R" are unsubstituted alkyl independently selected from the group consisting of $C_1$-$C_{10}$ alkyl.

3. The polymer according to claim 1, wherein said degradable blocks comprise the structure according to Formula (IV):

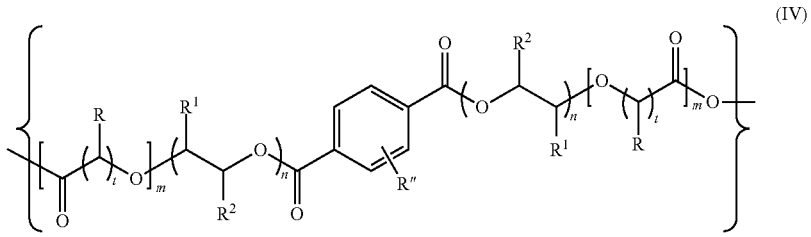
(IV)

wherein R is H or alkyl, and $R_1$, $R_2$, R", n, m and t are as defined in claim 1.

4. The polymer according to claim 3, wherein R is alkyl selected from the group consisting of $CH_3$ and $C_2H_5$.

5. The polymer of claim 1, wherein m has the value of 1 or 2.

* * * * *